United States Patent
Son (10) Patent No.: US 8,424,945 B2
(45) Date of Patent: Apr. 23, 2013

(54) CONNECTING STRUCTURE FOR CENTER PILLAR AND QUARTER MEMBER IN VEHICLE

(75) Inventor: Kyunghoon Son, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/296,823

(22) Filed: Nov. 15, 2011

(65) Prior Publication Data

US 2013/0038079 A1    Feb. 14, 2013

(30) Foreign Application Priority Data

Aug. 12, 2011 (KR) .................. 10-2011-0080519

(51) Int. Cl.
*B62D 27/02* (2006.01)
(52) U.S. Cl.
USPC ............................................................ 296/29
(58) Field of Classification Search .......... 296/29, 296/187.03, 187.12, 187.11, 193.05, 193.06, 296/193.08, 203.01, 203.03, 30
See application file for complete search history.

(56) References Cited

U.S. PATENT DOCUMENTS

| | | | | |
|---|---|---|---|---|
| 4,973,103 A * | 11/1990 | Imajyo et al. | ............ | 296/203.04 |
| 5,228,741 A | 7/1993 | Ide | | |
| 5,443,297 A * | 8/1995 | Tanaka et al. | ............ | 296/203.03 |
| 7,364,225 B2 * | 4/2008 | Tomioka | ............ | 296/203.04 |
| 7,472,948 B2 * | 1/2009 | Yatabe et al. | ............ | 296/203.04 |
| 8,029,043 B2 * | 10/2011 | Baumann | ............ | 296/187.12 |
| 2006/0066137 A1 | 3/2006 | Yatabe et al. | | |

FOREIGN PATENT DOCUMENTS

| | | |
|---|---|---|
| JP | 61-282172 A | 12/1986 |
| JP | 4-129883 A | 4/1992 |
| JP | 11-291947 A | 10/1999 |
| JP | 2007-84023 A | 4/2007 |
| JP | 2008-239128 A | 10/2008 |
| JP | 2009-292367 A | 12/2009 |
| KR | 10-2004-0029793 A | 4/2004 |
| KR | 10-0551251 B1 | 2/2006 |

* cited by examiner

*Primary Examiner* — H Gutman
(74) *Attorney, Agent, or Firm* — Morgan, Lewis & Bockius LLP (57) ABSTRACT

The connecting structure of a center filler and a quarter member of a vehicle may include a lateral junction portion formed at a front end of the quarter member, the lateral junction portion coupling with one side surface of the center filler in a direction substantially perpendicular to a longitudinal direction of the vehicle. The connection structure may further include a longitudinal coupling portion formed in the longitudinal direction of the vehicle coupled with an outer quarter member of the quarter member, a trim coupling portion substantially the same length as the longitudinal coupling portion coupled with trim, and a connection portion connecting the longitudinal coupling portion and the trim coupling portion to each other, wherein the lateral junction portion extends at a front end of the longitudinal coupling portion, and the lateral junction portion is bent substantially perpendicular to contact to the center filler.

6 Claims, 11 Drawing Sheets

CONNECTING STRUCTURE FOR CENTER PILLAR AND QUARTER MEMBER IN VEHICLE

CROSS-REFERENCE TO RELATED APPLICATIONS

The present application claims priority of Korean Patent Application Number 10-2011-0080519 filed Aug. 12, 2011, the entire contents of which application is incorporated herein for all purposes by this reference.

BACKGROUND OF INVENTION

1. Field of Invention

The present invention relates to a connecting structure for a center pillar and a quarter member in a vehicle without a rear door like a 2-door or 3-door vehicle, and more particularly, to a connecting structure for a center pillar and a quarter member in a vehicle without a rear door that improves a path to transfer a load applied from a rear side to a front side of the vehicle in a rear-side collision.

2. Description of Related Art

In general, since a 2-door vehicle such as a hatch back-type vehicle or a coupe-type vehicle or a 3-door vehicle having a left and right asymmetric structure which has begun to be launched in recent years has no rear door or a rear door at only one side, there is no passage through which collision energy applied from the rear side of the vehicle can be transferred to a front side of the vehicle in a rear-side collision.

Figure 1:
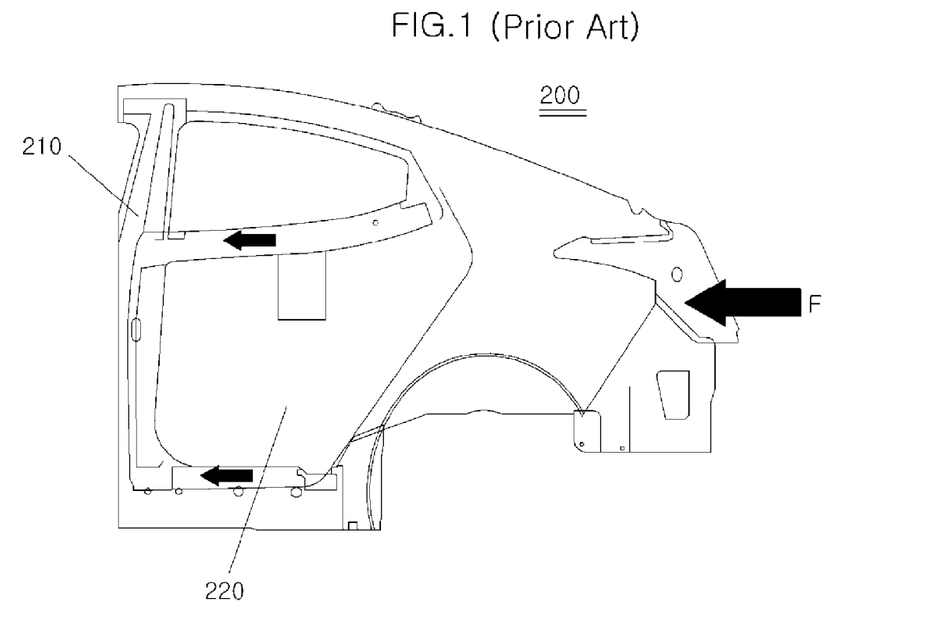
FIG. 1 is a schematic diagram showing a load transferring structure in a rear-side collision of a 4-door vehicle in the related art.

For example, in the case of a 4-door vehicle 200 shown in FIG. 1, a rear door 220 provided in a center pillar 210 serves as a passage through which energy transferred from the rear side of the vehicle is transferred to the front side of the vehicle, i.e., a load pass.

However, since the 2-door vehicle or 3-door vehicle has no rear door, a component that serves as the load pass to transfer the energy transferred from the rear side of the vehicle to the front side is required.

One of the example is described in Korean Patent Application Laid-Open No. 10-2004-0029793.

Figure 2:
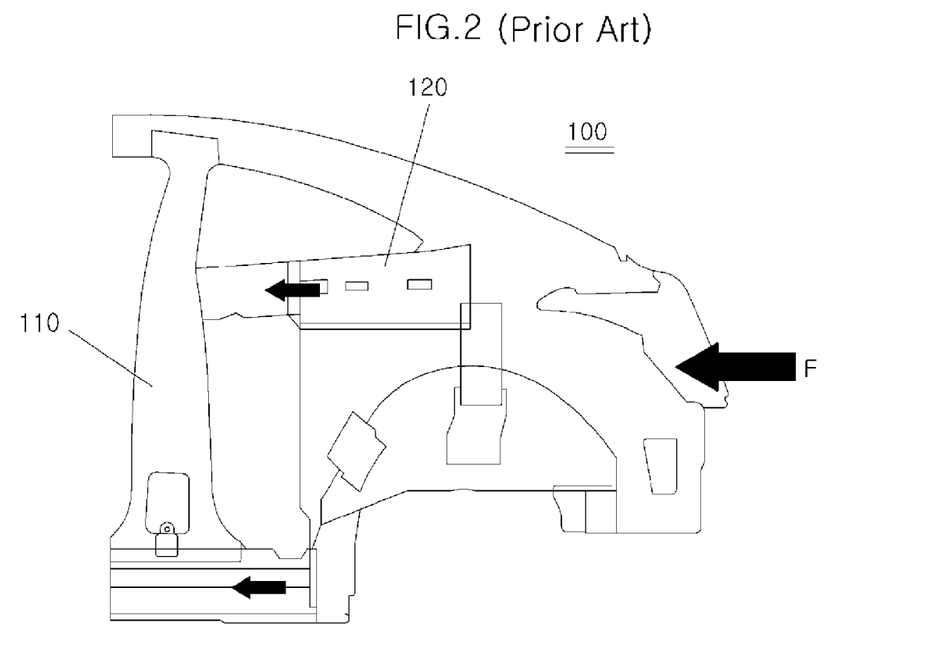
FIG. 2 is a schematic diagram showing a load transferring structure in a rear-side collision of a 2-door vehicle.

As shown in FIG. 2, a quarter member 120 connecting a rear pillar of the vehicle with a center pillar 110 of a 2-door vehicle 100 without the rear door is provided to transfer the energy from the rear side of the vehicle to the front side.

Figure 3:
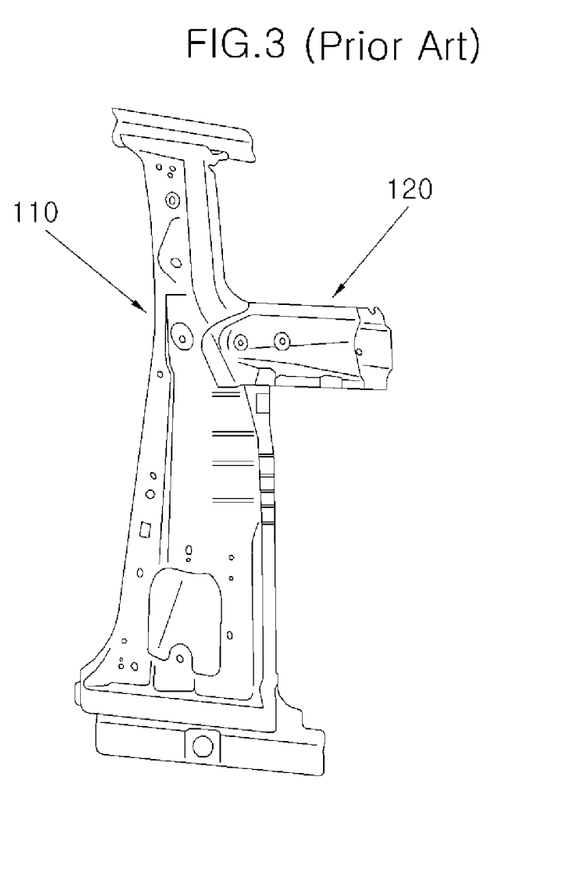
FIG. 3 is a perspective view showing a connecting structure of a center pillar and a quarter member in the related art.
Figure 4:
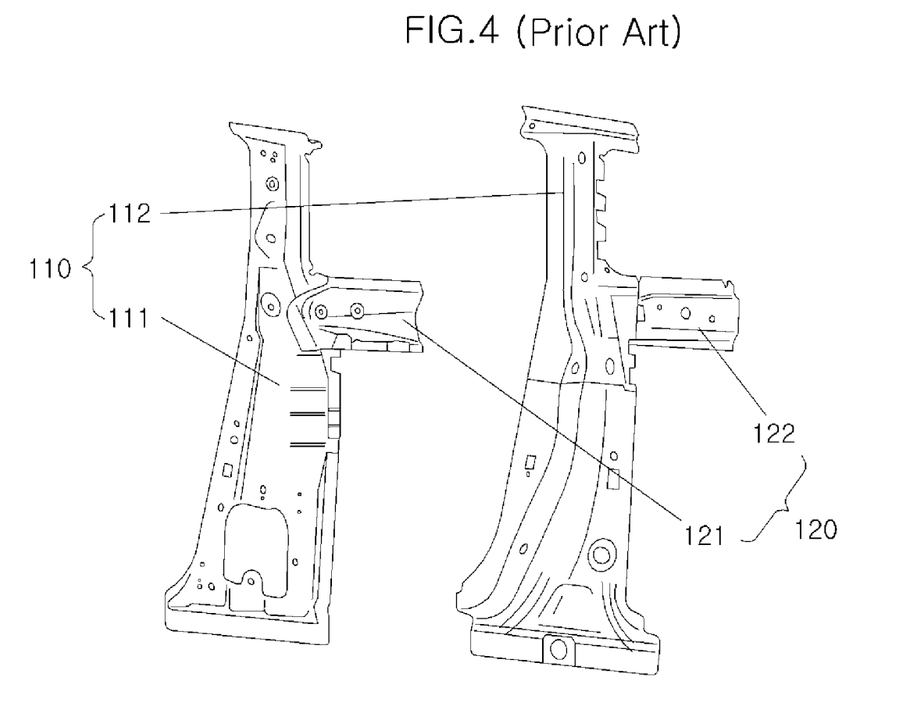
FIG. 4 is an exploded perspective view of FIG. 3.

More specifically, as shown in FIGS. 3 and 4, an outer quarter member 122 and an inner quarter member 121 are coupled to an outer center pillar and an inner center pillar 111 constituting center pillar 110 by welding and outer center pillar 112 and outer quarter member 122 that are coupled with each other are coupled with inner center pillar 111 and inner quarter member 121 to connect center pillar 110 and quarter member 120 to each other.

Figure 5:
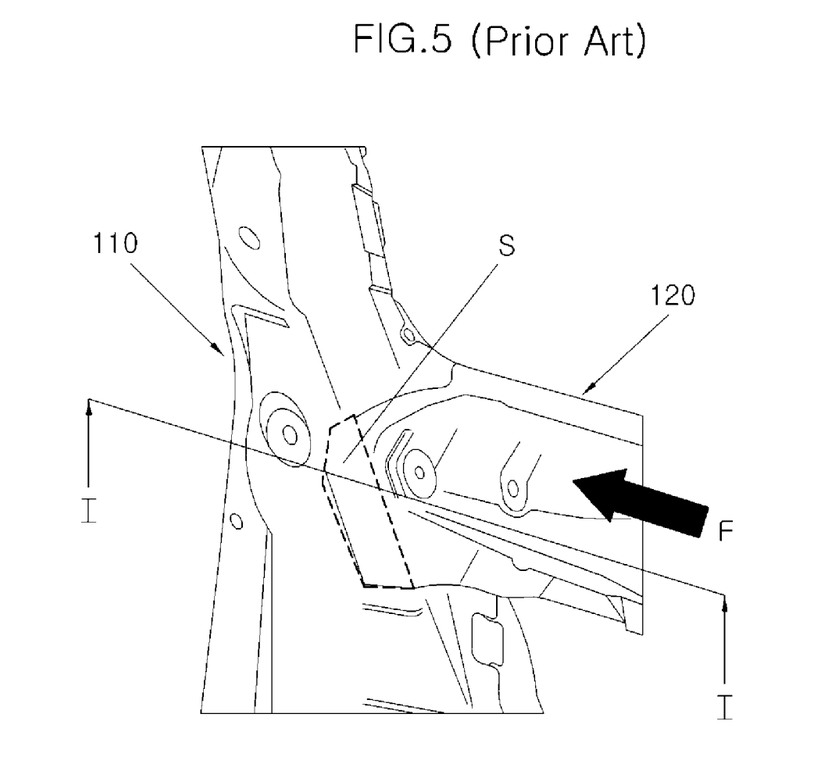
FIG. 5 is an enlarged diagram of a primary part of FIG. 3.
Figure 6:
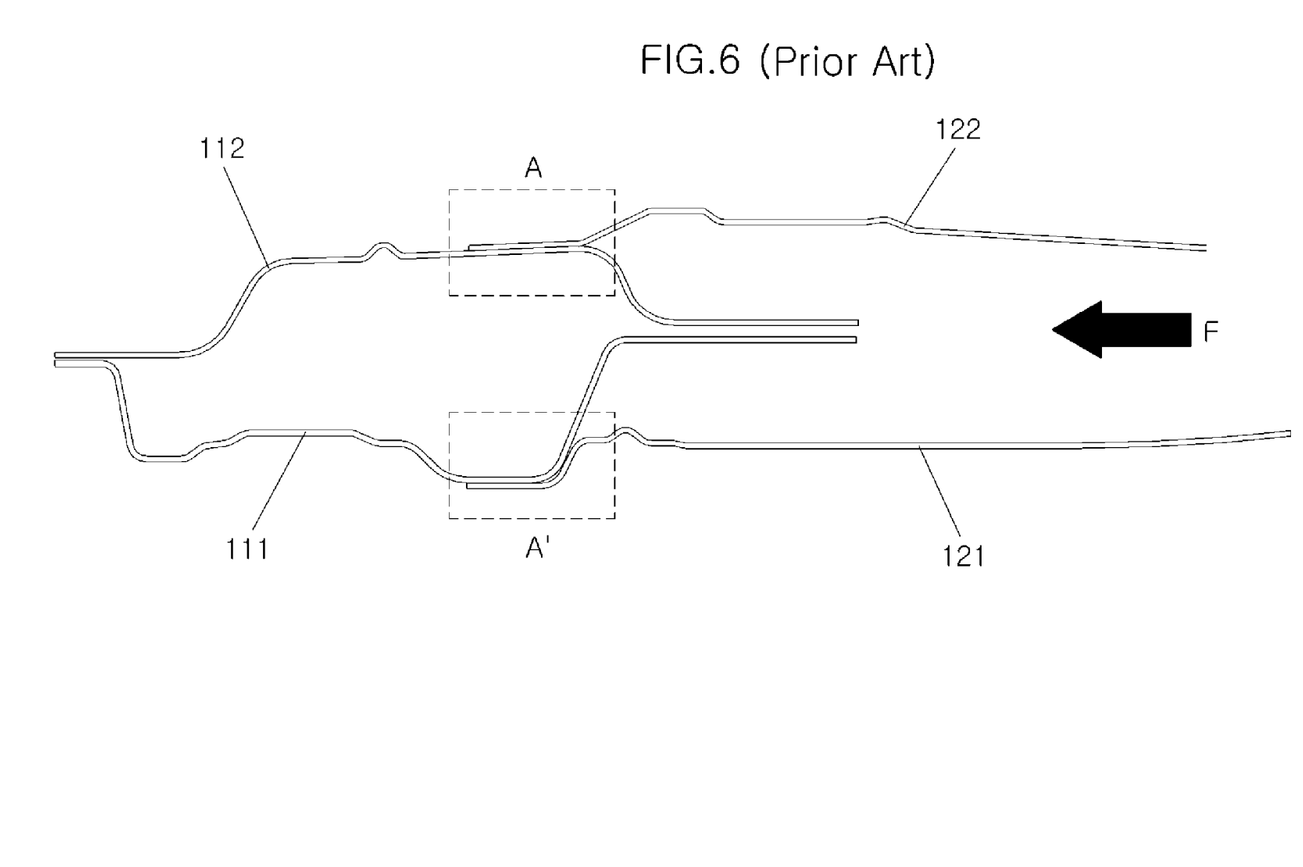
FIG. 6 is a cross-sectional view showing a load transferring structure in FIG. 5.
Figure 7:
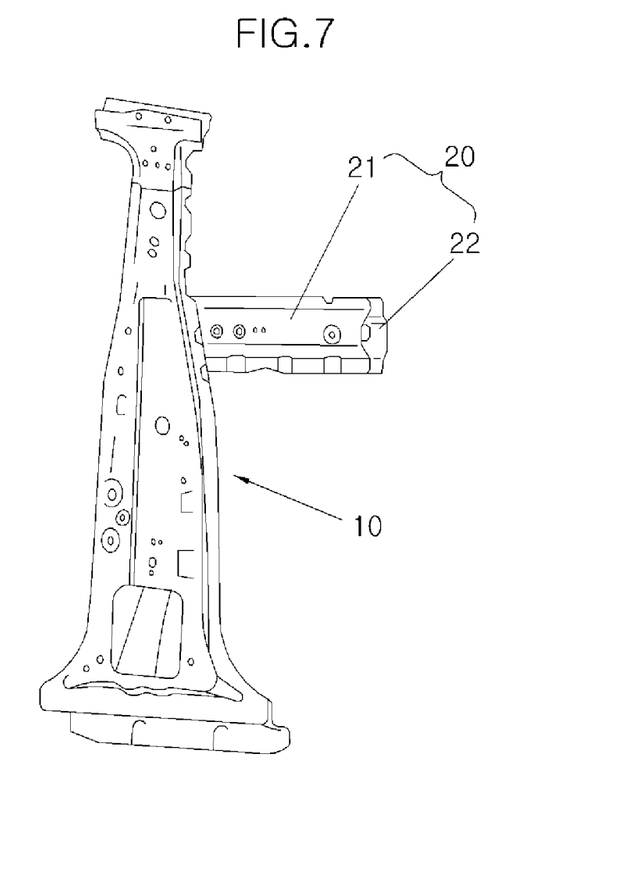
FIG. 7 is a perspective view showing an exemplary connecting structure of a center pillar and a quarter member of a vehicle without a rear door according to the present invention.
Figure 8:
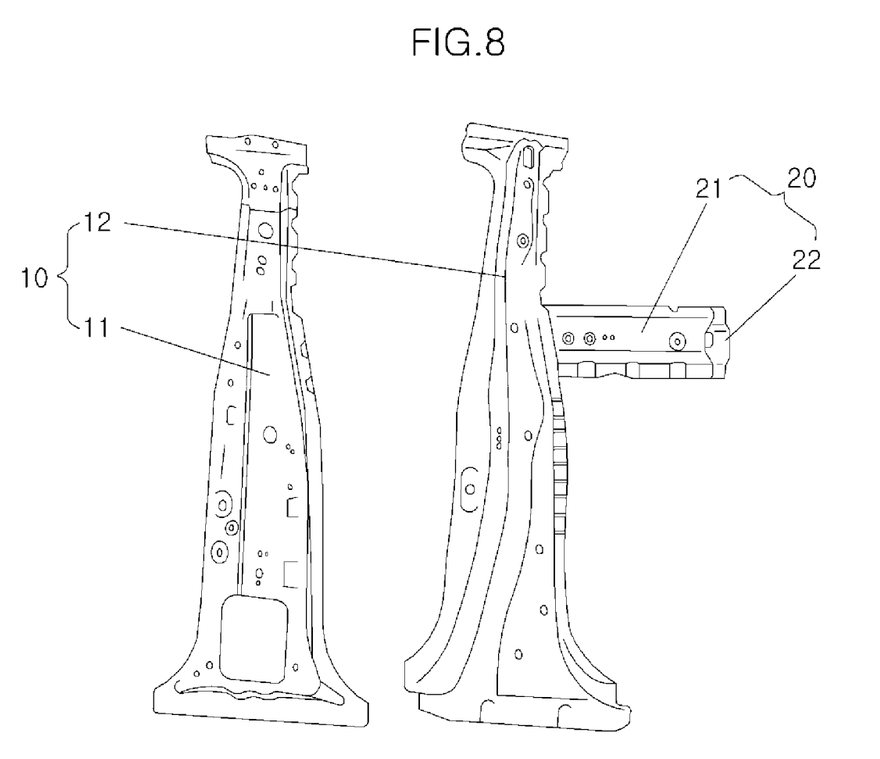
FIG. 8 is an exploded perspective view of FIG. 7.
Figure 9:
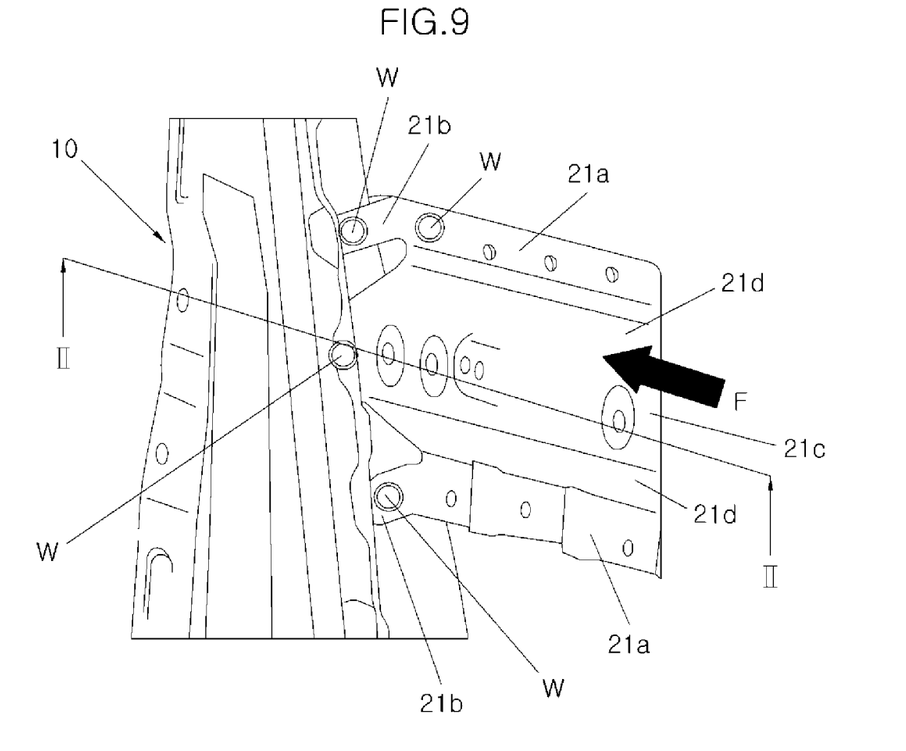
FIG. 9 is an enlarged diagram of a primary part of FIG. 7.

However, according to the connecting structure of center pillar 110 and quarter member 120 in the related art, when the load is applied as shown in FIGS. 5 and 6, outer quarter member 122 and inner quarter member 121 have a structure in which a transferred load cannot be transferred to outer center pillar 112 and inner center pillar 111 with only a shear load of a side coupling surface, respectively. That is, since center pillar 110 and quarter member 120 are coupled with each other through a side coupling surface indicated by S in FIG. 5, the load is transferred through parts indicated by A and A' as shown in FIG. 6.

As described above, according to the connecting structure of the center pillar and the quarter member in the related art, when the load is transferred from quarter member 120 to center pillar 110, the load is transferred with only a shear load of a connection portion between center pillar 110 and quarter member 120, such that the load cannot be efficiently transferred, and as a result, quarter member 120 is broken or a vehicle body is broken by a load applied from a rear side of a rear-seat space to injure a passenger in the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a connecting structure of a center pillar and a quarter member of a vehicle in which the quarter member transfers a load from a rear side of the vehicle in a perpendicular direction to the load as well as a side coupling portion with the center pillar parallel to a transferring direction of the load to stably transfer the load applied from the rear side of the vehicle to a front side of the vehicle in a vehicle without the rear door such as a 2-door or 3-door vehicle.

Exemplary connecting structures of a center pillar and a quarter member of a vehicle according to the present invention may include a lateral junction portion formed at a front end of the quarter member, the lateral junction portion coupling with one side surface of the center pillar in a direction substantially perpendicular to a longitudinal direction of the vehicle.

The center pillar may be constituted of an inner center pillar and an outer center pillar formed inside and outside a vehicle body respectively, and the quarter member may be constituted of an inner quarter member and an outer quarter member formed inside and outside the vehicle body respectively.

The inner quarter member and the outer quarter member may be preassembled to form the quarter member, and then the preassembled quarter member may be coupled to the center pillar.

Exemplary connecting structures of a center pillar and a quarter member of a vehicle according to the present invention may further include a longitudinal coupling portion formed in the longitudinal direction of the vehicle and coupled with an outer quarter member of the quarter member, a trim coupling portion formed in substantially the same length as the longitudinal coupling portion and coupled with a trim exposed to a room of the vehicle, and a connection portion connecting the longitudinal coupling portion and the trim coupling portion to each other, wherein the lateral junction portion extending in a front direction of the vehicle at a front end of the longitudinal coupling portion, the lateral junction portion bent substantially perpendicular to contact to the center pillar.

The inner quarter member may include the longitudinal coupling portion, the lateral junction portion, the trim coupling portion and the connection portion.

The inner quarter member may be formed by sequentially bending a cut plate. In the inner quarter member, the trim coupling portion may be positioned in the room side rather than the side as of the longitudinal coupling portion.

The inner quarter member may be coupled with the center pillar and the outer quarter member by spot welding.

The longitudinal coupling portion may be formed in each of upper and lower parts of the inner quarter member, and the trim coupling portion may be formed approximately at a center of the inner quarter member and the connection portion may be formed between the longitudinal coupling portion and the trim coupling portion.

According to exemplary constructing structures of a center pillar and a quarter member of a vehicle according to the present invention, a load transferred from a rear side of the vehicle is transferred in a substantially perpendicular direction to the load as well as a side coupling portion of the center pillar to improve structural strength at a coupling portion between the quarter member and the center pillar.

As described above, the structure in which the load is transferred at the coupling portion between the quarter member and the center pillar is improved, such that even though the load is applied from the rear side of the vehicle due to a rear-side collision, the applied load is transferred to the front side of the vehicle to secure a room space for a passenger, thereby reducing loss of life.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 11 is

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, referring to the accompanying drawings, exemplary connecting structures of a center pillar and a quarter member of a vehicle without a rear door according to the present invention will be described in detail.

Referring to FIGS. 7 to 10, in exemplary connecting structures of a center pillar and a quarter member of a vehicle without a rear door according to the present invention, a lateral junction portion 21b contacting center pillar 10 in a lateral direction substantially perpendicular to a longitudinal direction of the vehicle is formed at one end of quarter member 20, such that lateral junction portion 21b is coupled to center pillar 10, thereby transferring a load from a rear side of the vehicle to center pillar 10 through lateral junction portion 21b.

Center pillar 10 is formed by coupling an inner center pillar 11 positioned inside the vehicle and an outer center pillar 12 positioned outside the vehicle with each other. Center pillar 10 serves to separate a front seat and a rear seat from each other, support a roof of the vehicle, and support and disperse a load transferred through quarter member 20.

Quarter member 20 is placed substantially perpendicular to center pillar 10 approximately in the middle of center pillar 10, such that a front end of the quarter member facing the front side of the vehicle is coupled to the middle of center pillar 10 and a rear end is coupled to a rear pillar and a trunk side. Therefore, quarter member 20 receives the load applied from the rear side of the vehicle more preferentially than center pillar 10 and transfers the load to center pillar 10.

The front end of quarter member 20 is coupled to center pillar 10 through lateral junction portion 21b, which is substantially perpendicular to the longitudinal direction of the vehicle, to more stably transfer the load applied form the rear side of the vehicle to center pillar 10 as compared to the related art.

The configuration of quarter member 20 will be described below in detail. Quarter member 20 is constituted of an outer quarter member 22 positioned outside the vehicle and an inner quarter member 21 positioned in a room side of the vehicle with respect to outer quarter member 22.

Herein, inner quarter member 21 will be described below in more detail. Inner quarter member 21 is constituted of a longitudinal coupling portion 21a, a lateral junction portion 21b, a trim coupling portion 21c, and a connection portion 21d.

Longitudinal coupling portion 21a is formed in the longitudinal direction of the vehicle and placed parallel to outer quarter member 22. Outer quarter member 22 is coupled to longitudinal coupling portion 21a.

Lateral junction portion 21b is formed to be substantially perpendicular to longitudinal coupling portion 21a at a front end of longitudinal coupling portion 21a, i.e., a cross section of longitudinal coupling portion 21a facing the front side of the vehicle. Lateral junction portion 21b protrudes on the front end of longitudinal coupling portion 21a and is bent substantially perpendicular to longitudinal coupling portion 21a. Lateral junction portion 21b contacts one side of center pillar 10 to transfer the load inputted into quarter member 20 to center pillar 10 through lateral junction portion 21b when inner quarter member 21 is coupled to center pillar 10.

Unlike longitudinal coupling portion 21a, trim coupling portion 21c is positioned in the room side, and a plurality of locking holes are formed at trim coupling portion 21c and an internal trim is locked by using the locking holes.

Connection portion 21d connects longitudinal coupling portion 21a and trim coupling portion 21c with each other. Since longitudinal coupling portion 21a and trim coupling portion 21c are provided on different planes when inner quarter member 21 is processed, the connection portion is formed to be inclined to serve to connect longitudinal coupling portion 21a and trim coupling portion 21c to each other.

Longitudinal coupling portion 21a is formed in each of upper and lower parts of inner quarter member 21 and trim coupling portion 21c is formed approximately at the center of inner quarter member 21 and connection portion 21d is formed between longitudinal coupling portion 21a and trim coupling portion 21c.

One will appreciate that formation of longitudinal coupling portion 21a is not limited to the upper and lower parts of inner quarter member. It can be in other positions and can involve multiple parts of the inner quarter member. One will also appreciate that positions and numbers for coupling portion 21c, connection portion 21d and etc. can be varied as well.

Figure 11A:
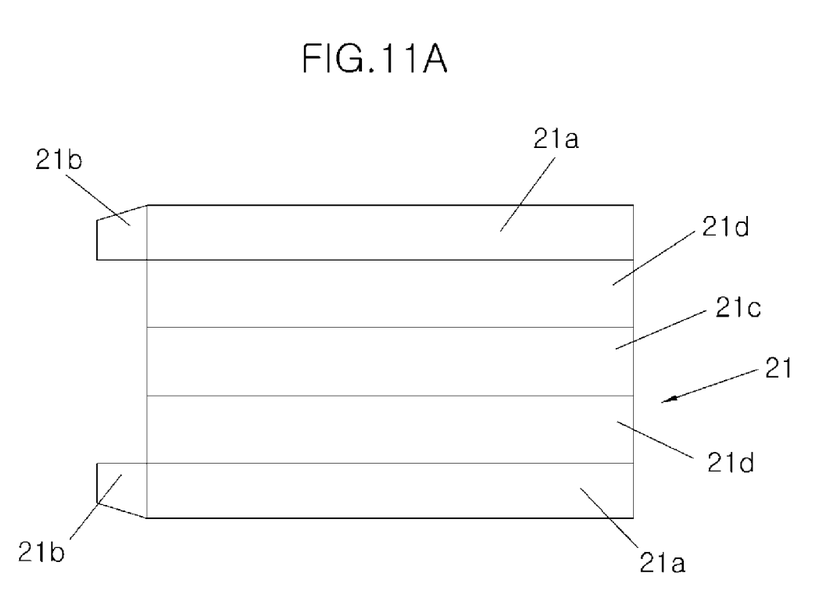
FIGS. 11A and 11B are perspective views showing a manufacturing process for an exemplary inner quarter member.
Figure 11B:
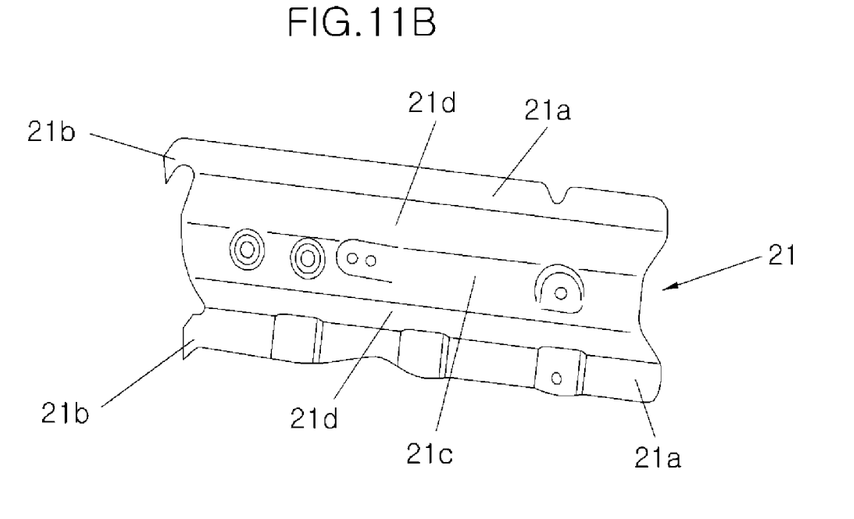

Inner quarter member 21 may be manufactured by bending a cut plate in a form shown in FIGS. 11A and 11B. Other similar or suitable manufacturing processes can be used as well.

The reason for manufacturing inner quarter member 21 through bending is that lateral junction portion 21b is formed at the longitudinal coupling portion substantially perpendicular or at an acute angle to longitudinal coupling portion 21a, such that when inner quarter member 21 is processed by using a press, lateral junction portion 21b is held on the press not to be ejected while inner quarter member 21 is processed and thereafter, ejected. Therefore, inner quarter member 21 is manufactured by sequentially bending the cut plate.

For example, the cut plate is fixed and thereafter, bent so that the connection portion is formed around trim coupling portion 21c and bent so that longitudinal coupling portion 21a is formed outside connection portion 21d and thereafter, bent so that lateral junction portion 21b is formed at the front end of longitudinal coupling portion 21a to manufacture inner quarter member 21.

When inner quarter member 21 is manufactured through the bending as described above, inner quarter member 21 is first coupled with outer quarter member 22 to be preassembled as quarter member 20 and preassembled quarter member 20 is coupled to center pillar 10. Inner quarter member 21 and outer quarter member 22 and quarter member 20 and center pillar 10 are coupled with each other by spot welding as shown by W in FIG. 9.

An operation of the connecting structure of the center pillar and the quarter member of the vehicle without the rear door according to various embodiments of the present invention will be described.

Compared with the related art in which the center pillar and the quarter member are placed in parallel to each other forming in general a tangential contact, various embodiments of the present invention can transfer the load from the rear side to the front side more stably. This is because the center pillar and the quarter member of the present invention contact substantially perpendicular to each other.

Figure 10:
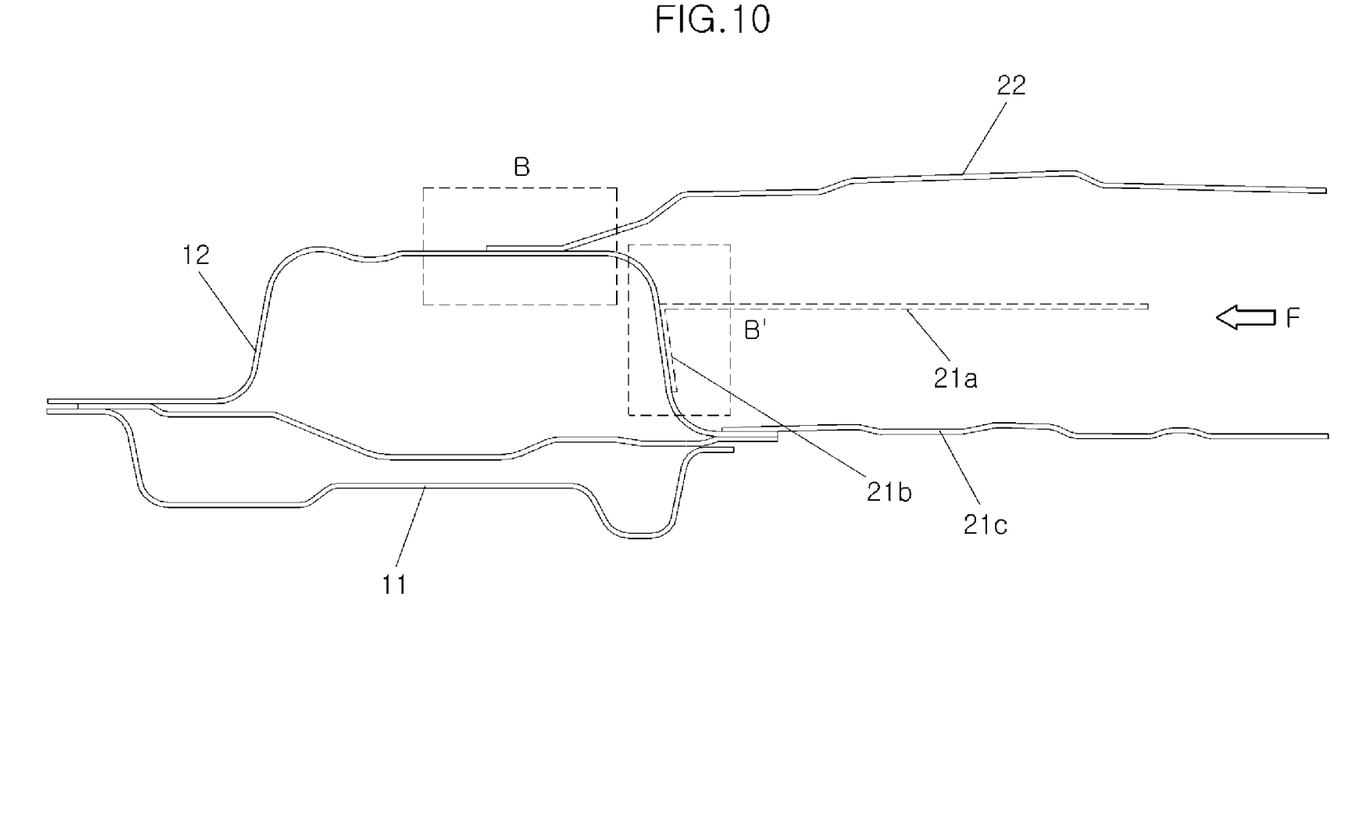
FIG. 10 is a cross-sectional view showing a load transferring structure in FIG. 7.

That is, as shown in FIG. 10, the load transferred to quarter member 20 is mostly transferred to center pillar 10 through parts indicated by B and B'. In the part indicated by B, the load is transferred to outer center pillar 12 through outer quarter member 22 in the form of shearing force.

However, in the part indicated by B', the load is transferred to center pillar 10 substantially perpendicular to a direction in which the load is applied through inner quarter member 21, particularly, lateral junction portion 21b to improve the rigidity of a coupling portion between center pillar 10 and quarter member 20. That is, since the entire area of lateral junction portion 21b contacts center pillar 10, the transferred load is evenly transferred to center pillar 10 through lateral junction portion 21b which is substantially perpendicular to the working direction of the load, and as a result, the rigidity of the junction portion is improved.

The rigidity is improved to prevent quarter member 20 from being broken due to the load transferred from the rear side, thereby improving stability by securing a room space.

For convenience in explanation and accurate definition in the appended claims, the terms front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A connecting structure of a center pillar and a quarter member of a vehicle, the connecting structure comprising a lateral junction portion formed at a front end of the quarter member, the lateral junction portion coupling with one side surface of the center pillar in a direction substantially perpendicular to a longitudinal direction of the vehicle, wherein the center pillar is comprised of an inner center pillar and an outer center pillar formed inside and outside a vehicle body respectively;

wherein the quarter member is comprised of an inner quarter member and an outer quarter member formed inside and outside the vehicle body respectively, wherein the inner quarter member includes:

a longitudinal coupling portion formed in the longitudinal direction of the vehicle and coupled with the outer quarter member;

the lateral junction portion extending in a front direction of the vehicle at a front end of the longitudinal coupling portion, the lateral junction portion bent substantially perpendicular to contact to the center pillar;

a convex coupling portion formed in substantially the same length as the longitudinal coupling portion and bulged toward the inside of the vehicle; and a connection portion connecting the longitudinal coupling portion and a trim coupling portion to each other; and wherein the longitudinal coupling portion is formed in each of upper and lower parts of the inner quarter member, the trim coupling portion is formed approximately at a center of the inner quarter member and the connection portion is formed between the longitudinal coupling portion and the trim coupling portion.

2. The connecting structure of the center pillar and a quarter member of a vehicle as defined in claim 1, wherein the inner quarter member and the outer quarter member are preassembled to form the quarter member, and the preassembled quarter member is then coupled to the center pillar.

3. The connecting structure of the center pillar and a quarter member of a vehicle as defined in claim 1, wherein the inner quarter member is formed by sequentially bending a cut plate.

4. The connecting structure of the center pillar and a quarter member of a vehicle as defined in claim 1, wherein in the inner quarter member, the trim coupling portion is positioned in the room side rather than the same side as of the longitudinal coupling portion.

5. The connecting structure of the center pillar and a quarter member of a vehicle as defined in claim 1, wherein the inner quarter member is coupled with the center pillar and the outer quarter member by spot welding.

6. The connecting structure of the center pillar and a quarter member of a vehicle as defined in claim 1, further comprising:
- a longitudinal coupling portion formed in the longitudinal direction of the vehicle and coupled with an outer quarter member of the quarter member;
- the trim coupling portion formed in substantially the same length as the longitudinal coupling portion and coupled with a trim exposed to a room of the vehicle; and
- a connection portion connecting the longitudinal coupling portion and the trim coupling portion to each other,
- wherein the lateral junction portion extending in a front direction of the vehicle at a front end of the longitudinal coupling portion, the lateral junction portion bent substantially perpendicular to contact to the center pillar.

* * * * *